(12) United States Patent
Velline et al.

(10) Patent No.: US 7,818,365 B2
(45) Date of Patent: Oct. 19, 2010

(54) SYSTEM, METHOD, AND COMPUTER PROGRAM PRODUCT FOR ONLINE AND OFFLINE INTERACTIVE APPLICATIONS ON MOBILE DEVICES

(75) Inventors: Andrew Velline, Redwood City, CA (US); Martin Kacin, Palo Alto, CA (US); Rajpal S. Sodhi, Foster City, CA (US)

(73) Assignee: Sybase, Inc., Dublin, CA (US)

( * ) Notice: Subject to any disclaimer, the term of this patent is extended or adjusted under 35 U.S.C. 154(b) by 1123 days.

(21) Appl. No.: 10/350,295

(22) Filed: Jan. 24, 2003

(65) Prior Publication Data

US 2003/0208559 A1 Nov. 6, 2003

Related U.S. Application Data

(60) Provisional application No. 60/376,562, filed on May 1, 2002.

(51) Int. Cl.
*G06F 15/16* (2006.01)
(52) U.S. Cl. .................. 709/203; 709/217; 709/219; 707/10
(58) Field of Classification Search .................. 709/203, 709/219, 231, 232, 217, 218; 707/10
See application file for complete search history.

(56) References Cited

U.S. PATENT DOCUMENTS 6,092,114 A * 7/2000 Shaffer et al. ............... 709/232
6,185,567 B1 2/2001 Ratnaraj et al.
6,208,345 B1 * 3/2001 Sheard et al. ............... 715/853
6,222,533 B1 4/2001 Notani et al.
6,341,316 B1 * 1/2002 Kloba et al. ................. 709/248
6,412,008 B1 * 6/2002 Fields et al. ................. 709/228
6,810,405 B1 * 10/2004 LaRue et al. ................ 707/613
6,980,137 B2 * 12/2005 Parry et al. .................... 341/50
7,143,419 B2 * 11/2006 Fischer et al. ............... 719/328
7,240,091 B1 * 7/2007 Hopmann et al. ........... 709/203
7,536,697 B2 * 5/2009 Wiseman et al. ............ 719/315
7,543,024 B2 * 6/2009 Holstege ..................... 709/206
7,730,124 B2 * 6/2010 Velline et al. ............... 709/203

OTHER PUBLICATIONS

International Search Report for Application No. PCT/US03/13328, mailed Sep. 5, 2003.
Cerami, Ethan. *Delivering Push*. New York: McGraw-Hill, 1998.

* cited by examiner

*Primary Examiner*—Lashonda T Jacobs
(74) *Attorney, Agent, or Firm*—Sterne, Kessler, Goldstein & Fox P.L.L.C.

(57) ABSTRACT

A system, method and computer program product for exchanging data between a client and information sources via a server. The invention operates by obtaining data objects from a plurality of sources, wherein the data objects have native data formats specific to the sources. The data objects are converted to a common data format, and are then transmitted to the client. At the client, the data objects are modified. The modified data objects are compliant with the common data format. The modified data objects are transmitted to the server, where they are converted to the native data formats specific to the sources associated therewith. Then, the converted modified data objects are transmitted to the associated sources.

14 Claims, 13 Drawing Sheets

If the original information (I1) is not the same as the newly queried information (I1<>I3), then the server knows that this information was modified at both the client and the source. Accordingly, a conflict exists. The server then proceeds according to predetermined conflict resolution procedures, such as:

Option 1: Client wins (update source with modified information I2)
Option 2: Source wins (do not update source)
Option 3: Ask user to resolve conflict

SYSTEM, METHOD, AND COMPUTER PROGRAM PRODUCT FOR ONLINE AND OFFLINE INTERACTIVE APPLICATIONS ON MOBILE DEVICES

CROSS-REFERENCE TO RELATED APPLICATIONS

This application claims the benefit of U.S. Provisional Application No. 60/376,562, filed May 1, 2002, which is herein incorporated by reference in its entirety.

BACKGROUND OF THE INVENTION

1. Field of the Invention

The present invention relates generally to mobile communications, and more particularly, to technology related to interactive applications while online and offline on mobile devices.

2. Related Art

A variety of mobile devices (such as personal data assistants, or PDAs, handheld computers, cellular phones, pagers, etc.) exist. Such mobile devices include ones based on the Palm operating environment and the Windows CE operating environment.

A variety of software applications for those mobile devices also exist.

The nature of mobility results in the use of these devices when no network is available to connect them to information sources. Also, mobile devices usually have limited user interface capabilities. The data that an individual mobile user may need is likely spread across multiple information sources. Thus, an immediate demand exists for presenting data from multiple information sources in a unified manner on mobile devices.

Also, mobile devices are usually disconnected from a network for long periods of time (perhaps weeks). Changes that a mobile user may make while utilizing data from the various information sources are likely to cause conflicts. Thus, a demand exists for providing updates of the changes made by the mobile user while disconnected from the network to resolve conflicts.

Therefore, what is needed is a system, method, and computer program product for synchronizing loosely connected computing devices with data from a plurality of information services and presenting the data in a single paradigm that enables a user to interact with the data without being connected to a network and update the information services with changes made by the user when the user reconnects to the network.

SUMMARY OF THE INVENTION

Briefly stated, the invention includes a system, method, computer program product, and combinations and sub-combinations thereof for enabling the synchronization of loosely connected computing devices with data from a plurality of information services and the presentation of the data in a single paradigm that enables a user to interact with the data without being connected to a network and update the information services with changes made by the user when the user reconnects to the network.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

FIGS. 11A and 11B illustrate the synchronization process of FIG. 5 in greater detail.

Figure 1:
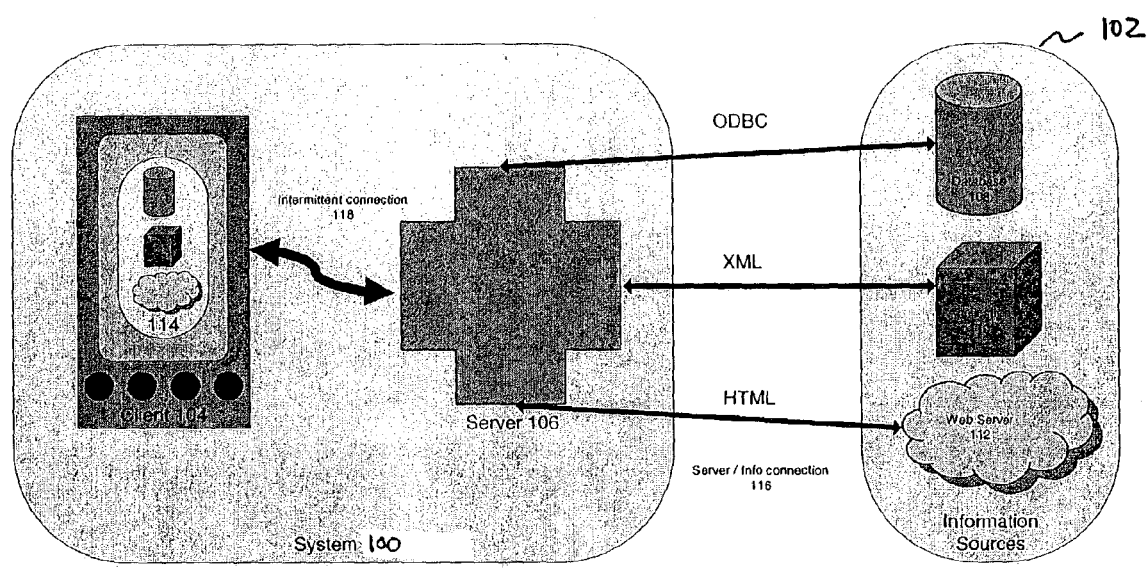
FIG. 1 is a block diagram illustrating an exemplary offline application system containing data from multiple online applications in accordance with an embodiment of the invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

The invention is a system, method, and computer program product for synchronizing loosely connected computing devices with data from a plurality of information services and presenting the data in a single application paradigm to allow a user of the system to interact with the data without being connected to a network. The system of the present invention may retrieve information from information sources, such as, but not limited to, Web servers, databases, computer applications, etc. and synchronize the data from those information sources to the computing device. The system then provides the user of the system a single application construct with the ability to view, interact, and manipulate the data without being connected to the information source or services. At a later time, the user can use the system when it is connected to a network to update the information services with the user's changes, and resolve potential conflicts.

Figure 6:
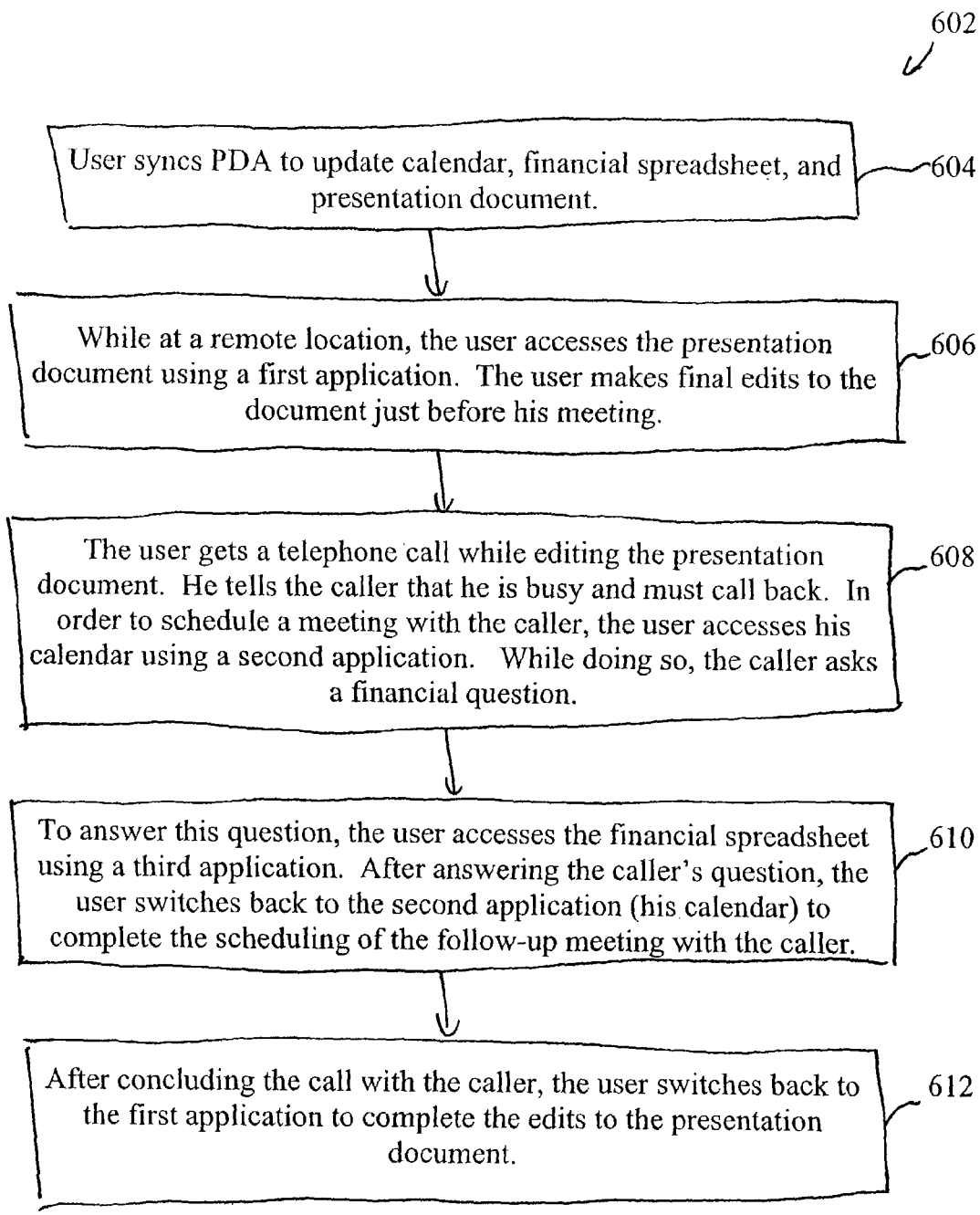
FIG. 6 illustrates a conventional approach for accessing data on a PDA, where the data is from multiple sources and is stored in multiple formats on the PDA.

Understanding and appreciation of the invention may be facilitated by considering an example, conventional process by which a user accesses and manipulates data stored on his PDA. This process is shown in Flowchart 602 of FIG. 6.

In step 604, a user syncs his PDA so as to update his calendar, a financial spreadsheet, and a slideshow presentation document, all of which are stored on his PDA. The user performs this step just prior to leaving for a remote location where he is giving a presentation using the slideshow presentation document.

In step 606, after arriving at the remote location, the user accesses the presentation document on his PDA using a first application. There are a variety of presentation software applications on the market, for example, MICROSOFT POWERPOINT. The user makes final edits to the presentation document using the first application as he waits for his meeting to begin.

In step 608, in the course of editing the presentation document (step 606), the user receives a phone call. The user tells the caller that he is busy and must call the caller back. In order to schedule a meeting with the caller, the user accesses his calendar on his PDA using a second application. There are a number of calendar program applications on the market, such as MICROSOFT OUTLOOK. In the course of reviewing his calendar using the second application, the caller asks the user a financial question.

In step 610, in order to be responsive and sensitive to the needs of the caller, the user accesses the financial spreadsheet on his PDA using a third application. This financial spreadsheet has the information that the user needs to answer the caller's question. There are a number of financial spreadsheet applications on the market, for example, MICROSOFT EXCEL. After answering the caller's question using the financial spreadsheet, the user switches back to the second application to review his calendar and complete the scheduling of the follow-up meeting with the caller.

In step 612, after completing the call with the caller, the user switches back to the first application to complete his edits to the presentation document. Thereafter, the user enters his meeting and makes his presentation using the presentation document.

As apparent from the above, in order to access his calendar, the financial spread sheet, and presentation document, the user must interact with a first application, a second application, and a third application. It is inefficient and possibly confusing to navigate through a multiplicity of applications, especially if each has a different user interface. Also, it is possible that the different applications may not operate well together. This introduces incompatibility and reliability issues. Accordingly, having to interact with a number of applications to manipulate data may adversely impact productivity. It would be much more preferably and advantageous if data on the PDA is accessible through a single interface, irrespective of the original source and format of the data. By doing so, the user's productivity can be greatly enhanced.

Turning now to the invention, an offline application system 100 that includes data from multiple online applications is shown in FIG. 1. Offline application system 100 comprises a client 104 and an application server 106. For exemplary purposes, client 104 is a personal digital assistant. In other embodiments of the invention, client 104 may be, but is not limited to, a handheld computer, a cellular phone, an Internet-enabled phone, a pager, etc. Although offline application system 100 is shown as having a single client 104, in reality, application server 106 services a plurality of clients. Application server 106 is a computer that provides services to other devices, such as client 104. Server 106 is loosely connected to client 104 via an intermittent connection 118. Intermittent connection 118 may exist persistently or be created and destroyed frequently.

Server 106 interchanges data with a plurality of information sources 102. Information sources 102 may include, but are not limited to, databases 108, applications 110, and Web servers 112. Server 106 connects to information sources 102 using a variety of connections and protocols. For example, server 106 may connect to databases 108 via ODBC (Open Database Connectivity). ODBC is a standard that allows databases created by various relational and non-relational database programs, such as, but not limited to, dBASE, Microsoft Access, Microsoft FoxPro, and Oracle, to be accessed by a common interface independent of the database file format. dBase, Microsoft Access, Microsoft FoxPro, and Oracle are well known database programs to those skilled in the relevant art(s). The invention is applicable with information of a variety of data formats. For example, server 106 may retrieve data from applications 110 in XML (Extensible Markup Language) format. XML is a pared-down version of SGML (Standard Generalized Markup Language), which is a system for organizing and tagging elements of a document. XML allows designers to create their own customized tags, enabling the definition, transmission, validation, and interpretation of data between applications. XML is well known to those skilled in the relevant art(s). Server 106 may connect to Web server 112 in HTML (HyperText Markup Language) format. HTML is a software language, comprised of ASCII text surrounded by HTML commands in angle brackets, used for creating Web pages. HTML is well known to those skilled in the relevant art(s).

Data retrieved from information sources 102 is processed on server 106 and transmitted to client 104 over intermittent connection 118. A user may then view one or more information sources 102 in an integrated manner on client 104. The user may modify, create, or delete data associated with any one of information sources 102 that resides on client 104 while offline. Any modifications, creations, or deletions made by the user on client 104 while offline will be communicated back to the appropriate information sources via server 106 upon subsequent connection to server 106. The changes may be submitted to information sources 102 at the request of the user or automatically upon subsequent connection to server 106.

Figure 2:
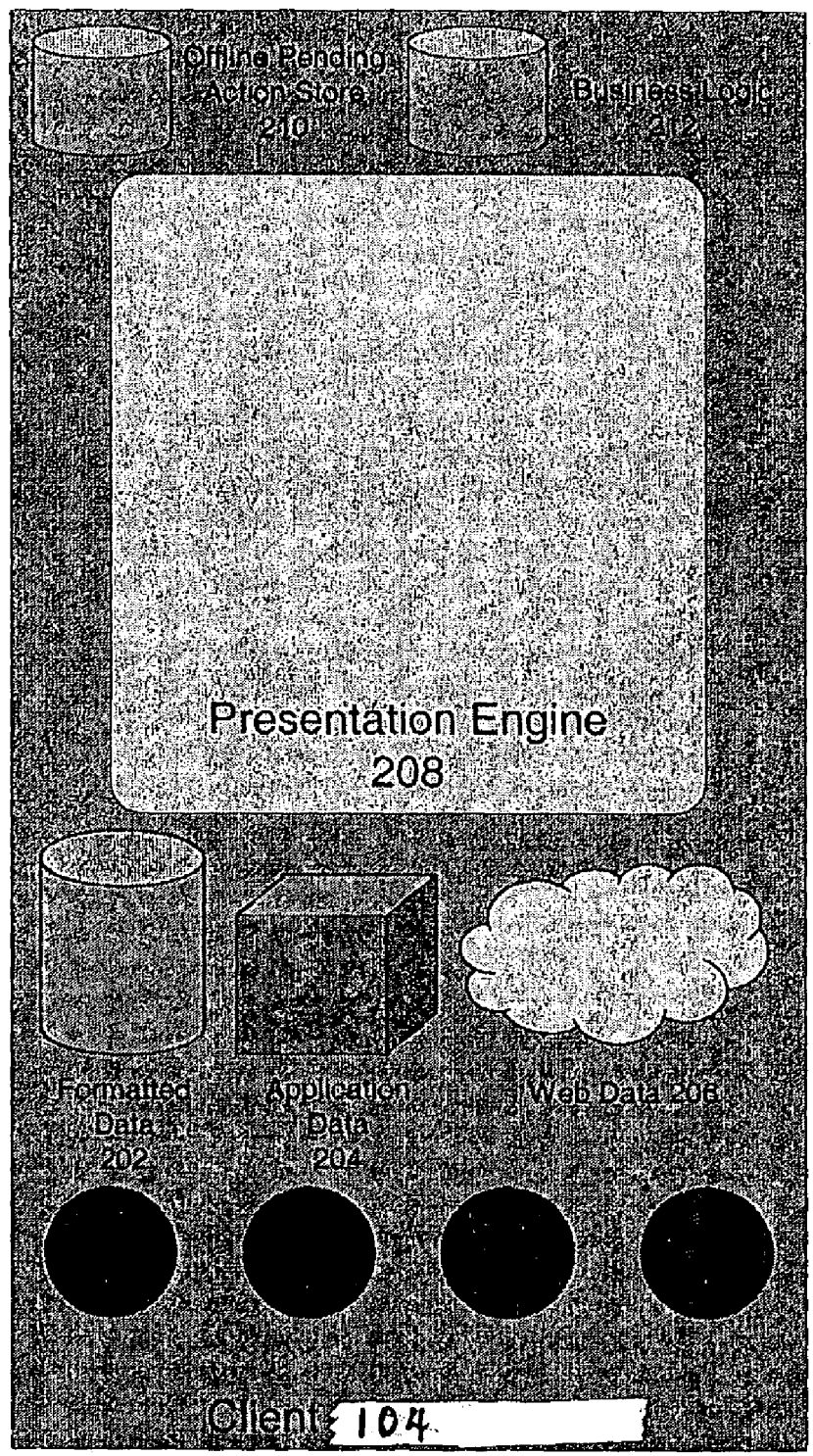
FIG. 2 illustrates an exemplary client as embodied by a personal digital assistant (PDA).

FIG. 2 is a block diagram illustrating client 104 embodied as a personal digital assistant. As previously stated, although client 104 is described in terms of a personal digital assistant, client 104 is not limited to this embodiment. Other embodiments of client 104, as indicated above, may also be used. Client 104 comprises local storage units 202, 204, and 206, a presentation engine 208, an offline pending action storage unit 210, and a business logic unit 212.

Storage unit 202 is used to store formatted data, such as, for example, databases 108. Storage unit 204 is used to store application data, such as, for example, application data from applications 110. Storage unit 206 is used to store Web data, such as, for example, Web data from Web server 112.

Presentation engine 206 is a software module for displaying information to the user and enabling the user to interact with the information displayed in a well known manner.

Offline pending action storage unit 210 is used to store actions to be performed when a connection to server 106 is reestablished. As changes are made to the data, the changes are queued in offline pending action storage unit 210 for use in a subsequent synchronization. For example, a data modification made to any one information source 102 is queued in offline pending action storage unit 210 for updating the respective information source 102 when the connection to server 106 is reestablished.

Local business logic 212 accesses data stored in any one of storage units 202, 204, and/or 206, and formats the data for display on presentation engine 208. Further details regarding local business logic 212, and the manner in which such local business logic 212 is stored in storage units 202, 204, and/or 206, is provided in U.S. patent application Ser. No. 09/560,965 filed Apr. 28, 2000, now U.S. Pat. No. 6,341,316, which is incorporated herein by reference in its entirety.

Figure 3:
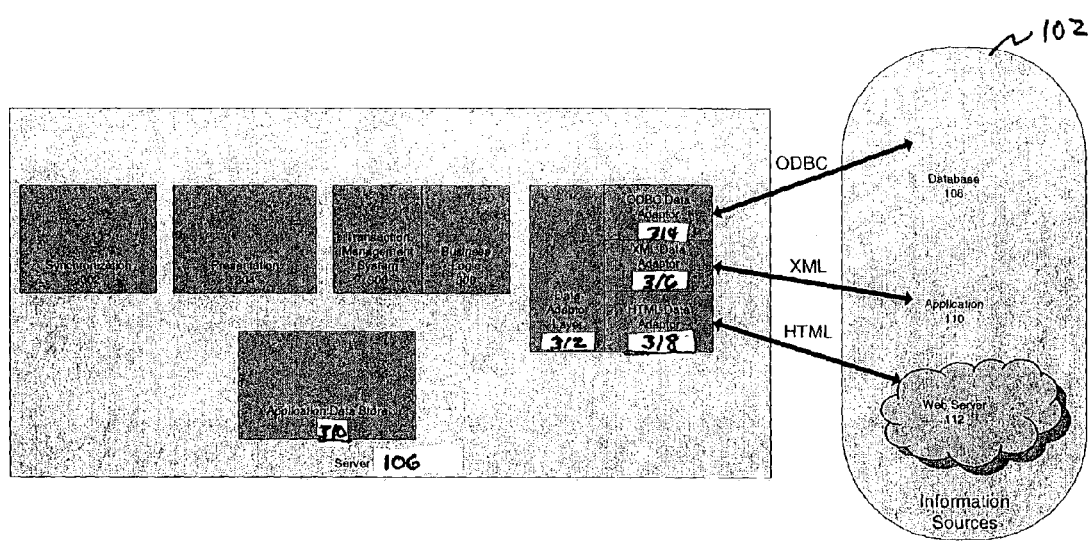
FIG. 3 is a block diagram illustrating an exemplary application server in accordance with an embodiment of the invention.

FIG. 3 is a block diagram illustrating an exemplary application server 106. Application server 106 comprises a synchronization module 302, a presentation module 306, a transaction management system module 306, a business logic module 308, an application data store module 310, a data adapter layer module 312, an ODBC data adapter module 314, an XML data adapter module 316, and an HTML data adapter module 318.

Synchronization module 302 controls the synchronization of data to client 104. Synchronization module 302 is responsible for communicating with client 104 and interpreting any changes that may have occurred since the last synchronization.

The sync operation of the invention includes various synchronization processes that can collect information from information sources 102 to server 106, and to the client 104. The usage of the term "sync," as described herein, refers to the overall operation of connecting a client to a server for the exchange, interaction, creation, and removal of data.

In one embodiment, syncing can be defined as mirroring data on a client and a server, such that the data is the same on client and server. In other embodiments, syncing can be defined as overwriting data on a client or on a server, such that the data on either a client replaces the data on a server, and vice versa.

Presentation module 304 formats the data for offline viewing by the user. The data may be configured using a variety of means, including, but not limited to, HTML, XML, XSLT, and JavaScript, all of which are well known to those skilled in the relevant, art(s).

Transaction management system module 306 is used to manage potential conflicts for subsequent client 104 connections. Transaction management system module 306 and business logic module 308 may interactively operate to resolve any conflicts that may occur. Such conflicts may result from data being changed in an incompatible way on information source 102 or client 104. Conflicts may also result from changes made by client 104 that fall outside the parameters set by business logic module 308. Transaction management system module 306 and business logic module 308 may also resolve other types of conflicts that may occur.

Business logic module 308 is also used to integrate information sources 102.

Local application store module 310 is used to cache information from information sources 102. Such information sources may include, but are not limited to, databases 108, applications 110, and Web server 112. Module 310 is also used to store configuration information, user settings, and the transaction log (see step 406 of FIG. 4).

All communication to information sources 102 occurs at data adapter layer 312. This configuration provides a unified way of interacting with a variety of data types. Communication between each information source 108, 110, and 112, occurs within a corresponding data adapter, as shown in FIG. 3. For example, ODBC data adapter 314 communicates with databases 108, XML data adapter 316 communicates with applications 110, and HTML data adapter 318 communicates with Web server 112. Other types of data adapters may be used for accessing other forms of information sources. The data retrieved from each information source 102 may be converted to a common data format. Since many of the information sources are tuned for online access, only server 106 stores the data in application data store module 310.

The present invention is a system, method, and computer program product for allowing offline viewing of one or more information sources 102 in an integrated manner on a mobile device, such as client 104. The user of client 104 may interact with the one or more information sources 102 while client 104 is offline. Such interaction may include modification of data, creation of data, or deletion of data. All changes are communicated to information sources 102 upon subsequent connection of client 104 with server 106. Allowances are made for potential conflicts. Such conflicts, and/or any new server side data are communicated to client 104 prior to intermittent connection 118 being severed.

Figure 4:
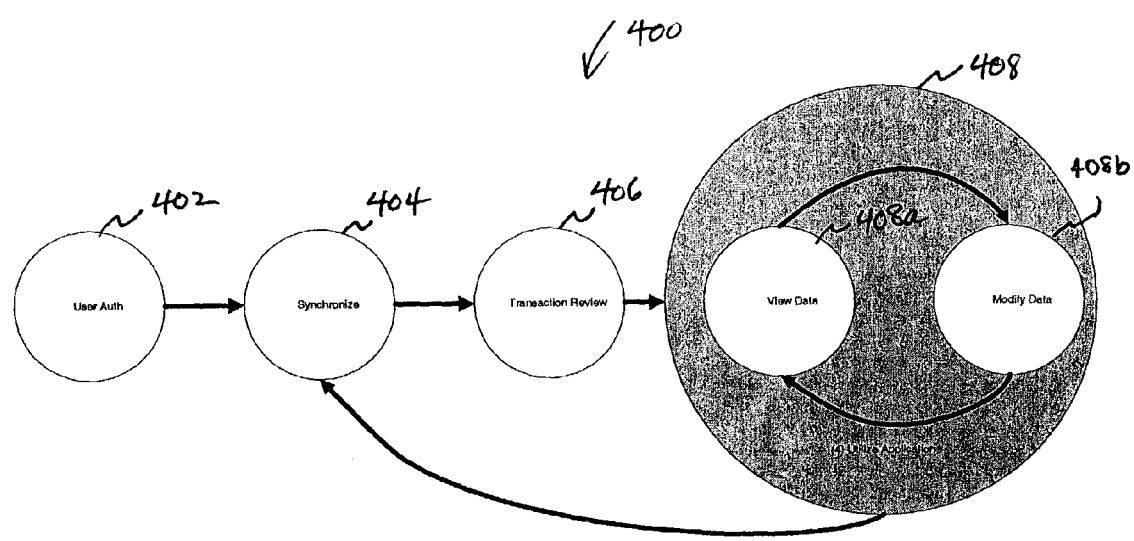
FIG. 4 is a flow diagram illustrating a method for using the invention from a user's point of view in accordance with an embodiment of the invention.

FIG. 4 is a flow diagram 400 illustrating a method for using the invention from a user's point of view in accordance with an embodiment of the invention. The invention, however, is not limited to the description provided herein with respect to flow diagram 400. Rather, it will be apparent to persons skilled in the relevant art(s) after reading the teachings provided herein that other functional flows are within the scope and spirit of the present invention. The process begins with step 402.

At step 402, user authorization is performed. A user identifies him/herself to client 104 through the use of a username and password. In an alternative embodiment, user authorization is performed using client-side security certificates. In another embodiment, user authorization is performed using biological identifications, such as fingerprints, retinal scans, or signatures.

At step 404, client 104 communicates the identity of the user to server 106. Upon identification of the user, data sent by client 104 is synchronized with server 106. That is, changes (insertions, deletions, data updates, etc.) are reconciled with any changes to the data that exists on information sources 102 that have occurred since the last synchronization or sync. The data may include, but is not limited to, unstructured data, SQL data, XML data, application data, and Web data. The synchronization process is described in detail below with reference to FIG. 5.

If a conflict is detected, application server 106 will attempt to resolve the conflict. A conflict might be an attempt to modify the same data from both client 104 and information source 102. Changes are either accepted or rejected. A change may be rejected for many reasons. One such reason is a violation of business logic. Another reason for rejecting a change may be lack of storage for the change or lack of connectivity to information source 102.

At step 406, all transactions, whether accepted or not, are reflected in a log. The log is sent to client 104 for review by the user. A transaction is defined by an ordered set of changes. If all changes in the set are accepted by information sources 102, the changes will be applied. If any of the changes are rejected, then none of the changes in the set may be applied.

At step 408, the user enters a cycle of application utilization which includes viewing the data (step 408*a*) and modifying the data (step 408*b*). Data can be viewed in a variety of ways, which are well known to those skilled in the relevant art(s). Data changes can be made as well. At the user's discretion, and some time later, client 104 may reconnect with server 106 by returning to step 404, where steps 404-408 are repeated.

Figure 7:
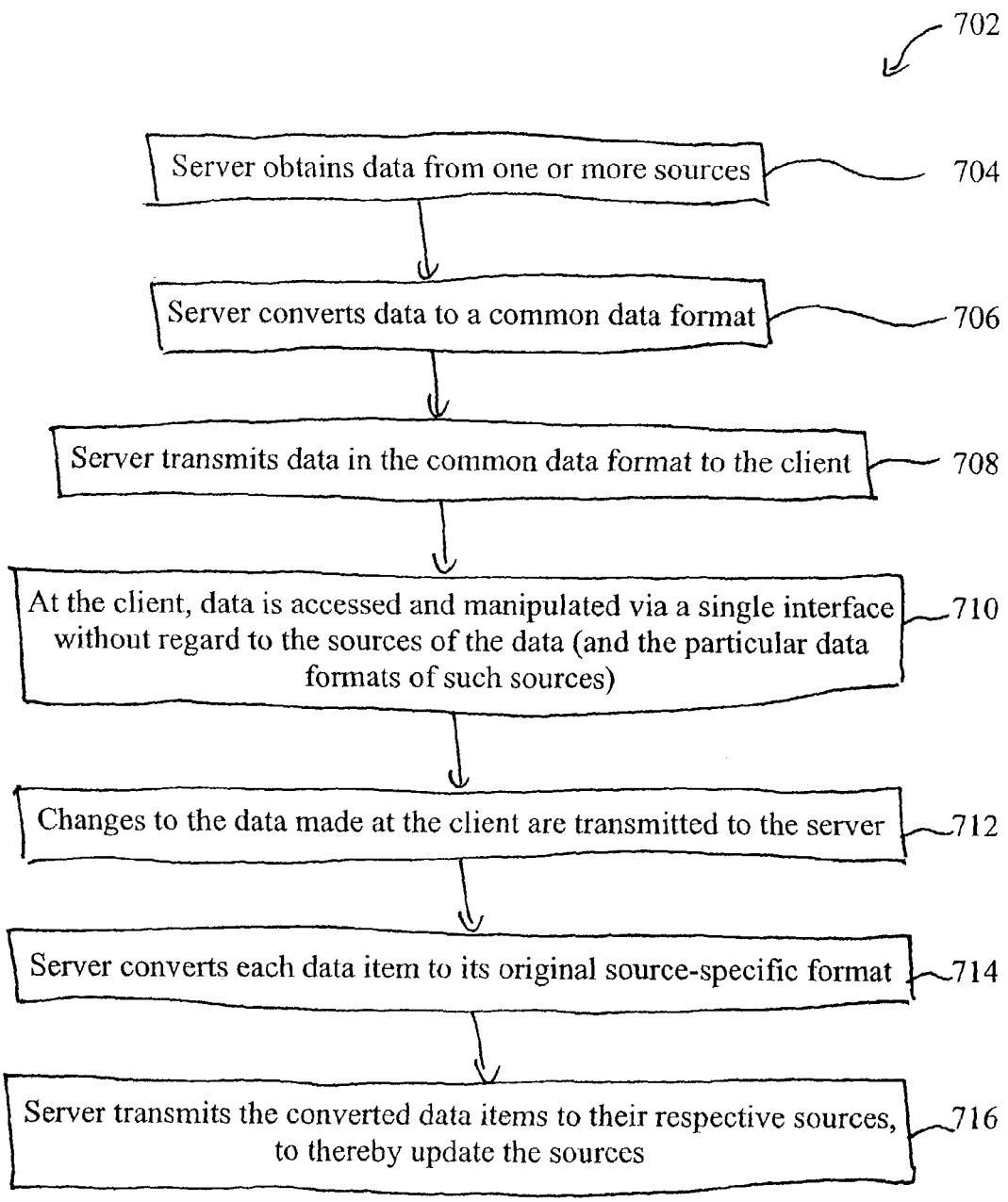
FIGS. 7-10 illustrate the operation of a server and a client according to an embodiment of the invention.

The operation of the invention shall now be described in greater detail with respect to a Flowchart 702 shown in FIG. 7.

In step 704, the server 106 obtains data from one or more sources 102. The data from any particular source 102 is in a format specific to the source 102. For reference purposes, this format is called the native or original format. Since the data is from multiple sources 102, the data is in a number of native formats.

In step 706, the server 106 converts this data to a common data format. The server 106 includes a number of adapters, such as ODBC data adapter 314, XML data adapter 316, and HTML data adapter 318, to perform this conversion. These adapters 314, 316, and 318 are specific to the particular data sources. Each of the adapters 314, 316, and 318 is associated with a data source, understands the native format of this data source, and is capable of converting the data in the native format to the common data format. Generally speaking, each adapter 314, 316, 318 performs a mapping (or transformation) between the respective native format and the common data format. The data adapter layer 312 coordinates and controls the operation of data adapters 314, 316, 318 to perform the operations just described.

Figure 8:
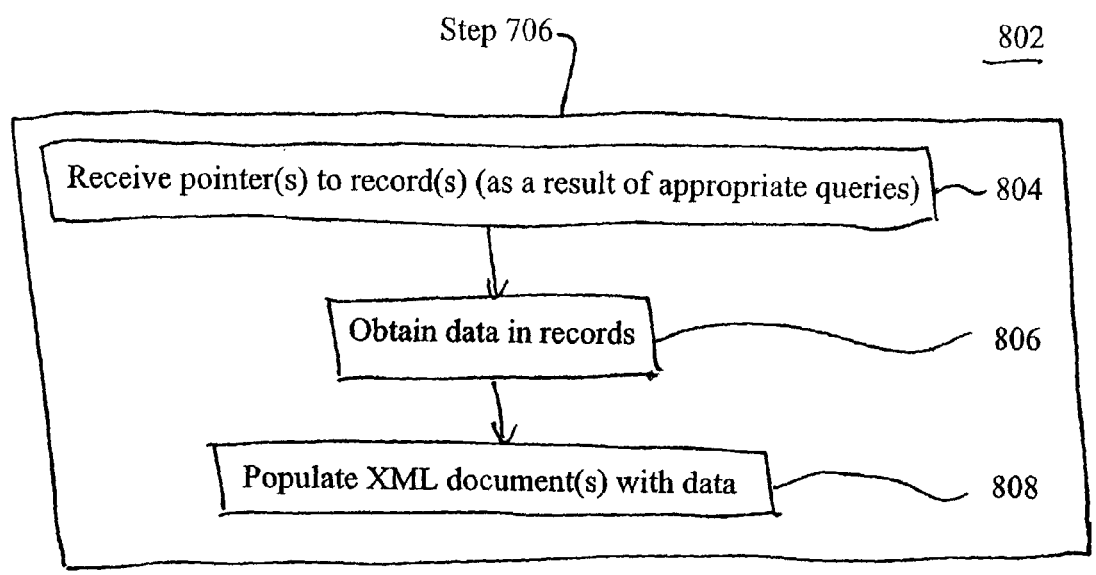

FIG. 8 illustrates a Flowchart 802 representing an example operational flow diagram of the ODBC data adapter 314 as it converts an ODBC data object received from a data source 102 to the common data format. As just noted, the ODBC data adapter 314 takes advantage of its knowledge of the native format of the ODBC data object received from the source 102, as well as the common data format, to make this transformation.

In step 804, the ODBC data adapter 314 receives one or more pointers to database records that are returned as the result of appropriate queries to the data source 102 made by the ODBC data adapter 314.

In step 806, the ODBC data adapter 314 obtains the data that is contained in the records referenced by the pointers. This is done using database techniques apparent to persons skilled in the relevant arts.

In step 808, the ODBC data adapter 314 populates a data object in the common data format with the data obtained in step 806. For example, in an embodiment, the invention uses an XML data object in the common data format. Accordingly, in step 808, the ODBC data adapter 314 populates this XML data object with the data obtained in step 806.

Figure 10:
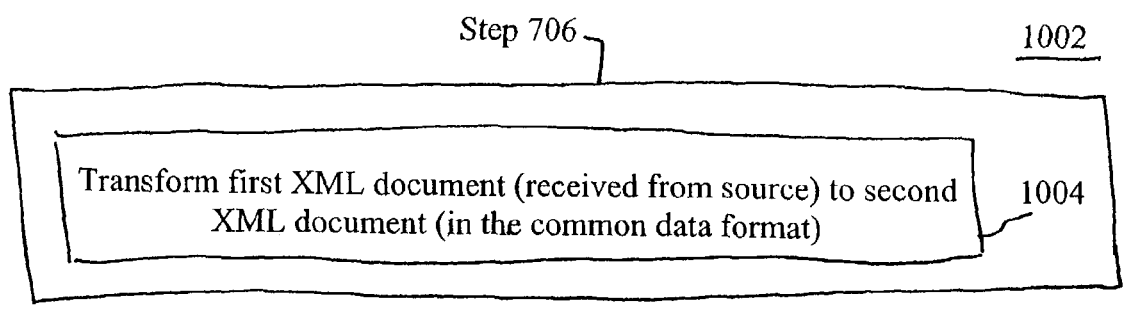

Flowchart 1002 in FIG. 10 illustrates an example operational flowchart of the XML data adapter 316. In step 1004, the XML data adapter 316 transforms a first XML document, received from a source 102 and in a native format, to a data object compliant with the common data format. For example, in an embodiment, the common data format defines an XML document. Accordingly, in this example, the XML adapter 316 in step 1004 transforms the first XML document (received from the source 102 and in the native format) to a second XML document that is compliant with the common data format.

The operation of additional data adapters for other data sources having other native formats will be apparent to persons skilled in the relevant arts based on the discussion contained herein. The scope and spirit of the invention include such other data adapters.

Figure 9:
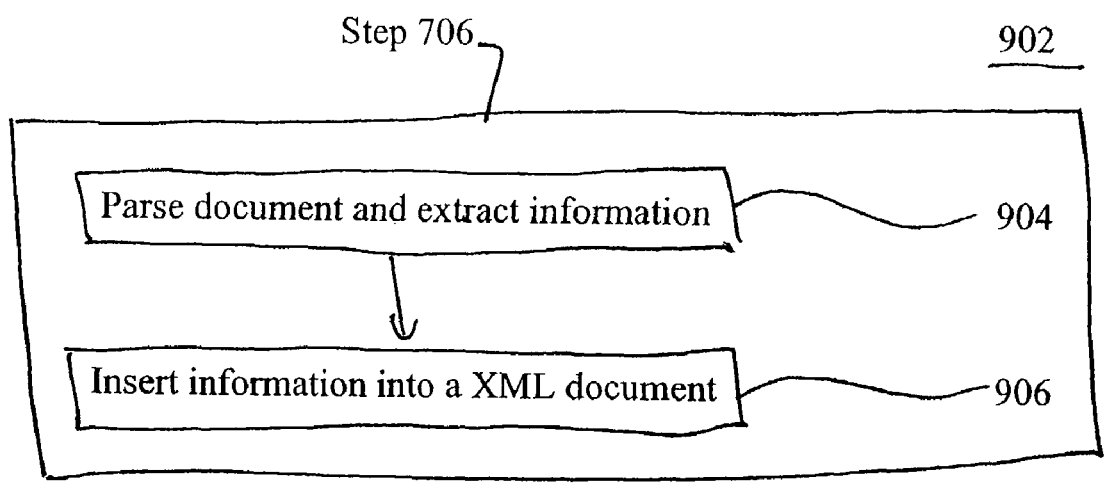

For example, the invention includes a data adapter that converts a commercial word processing document to a data object compliant with the common data format. For example, consider the case where the server 106 receives from a source 102 a document in a MICROSOFT WORD format. The operation of a corresponding data adapter contained in the server 106 is shown as Flowchart 902 in FIG. 9.

In step 904, the adapter parses the WORD document to extract information that will be used to populate the common data format-compliant data object. In this example, the WORD document is structured in a pre-defined manner such that the location of desired data in the WORD document is known to the data adapter. Since its structure is known, the adapter is able to parse the document to extract the desired data items.

In step 906, the adapter inserts the information extracted from step 904 into the common data format-compliant data object. In example, this common data format-compliant data object is an XML document. Accordingly, in this example, in step 906 the adapter inserts the information extracted during step 904 into this XML document.

Returning to FIG. 7, in step 708, the server 106 transmits the data (in the common data format) to the client 104, typically during a sync operation.

In step 710, at the client 104, the user accesses the data stored in the client 104 using a single interface. The user also manipulates the data using this single interface. This interface is independent of the sources 102 of the data 102, and the particular native data formats of those sources 102. This is possible to do since the data in the client 104 is in the common data format. Since a single data format is used, a single interface can be used to access and manipulate the data.

Figure 12:
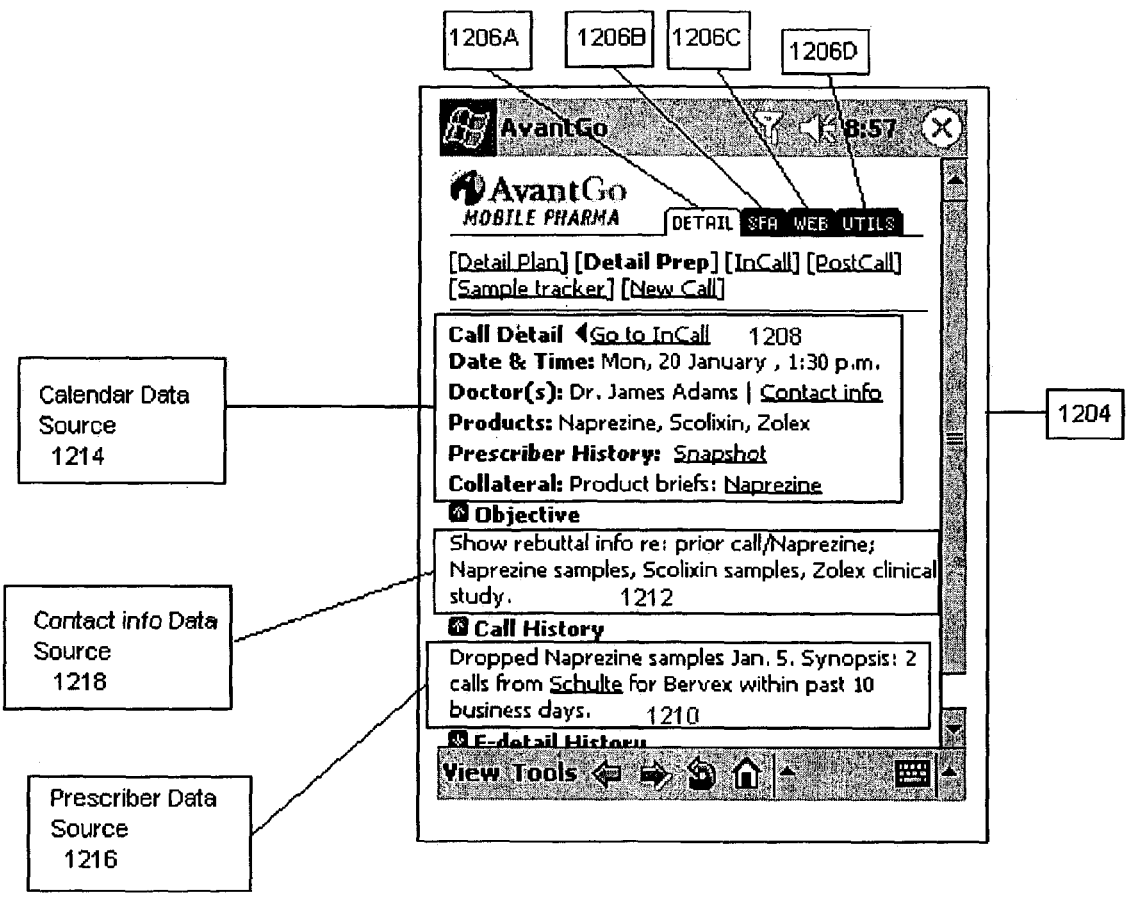
FIG. 12 illustrates an example client user interface that operates on data having a common data format.

An example interface for manipulating and accessing the data at client 104 is shown in FIG. 12. This interface 1202 illustrates a number of pages accessible via tabs 1206. In this example, each tab corresponds to one or more data sources. For example, tab 1206A includes fields 1208, 1210, 1212 that are populated with data from three data sources: a source 1214 of calendar information, a source 1216 of prescriber data, and a source 1218 of contact information.

The tabs 1206 of the interface 1202 share a single user interface paradigm/construct. This enhances useability. Also, since the data objects stored in the client 104 have a single common data format, the operations in the client 104 are compatible with one another. This enhances interoperability and reliability. As a result, it is much easier for the user to access and manipulate the data, thereby increasing the accuracy, efficiency, and productivity of the user.

Referring again to FIG. 7, in step 712, changes made to the data at the client 104 are transmitted to the server 106, for example during a subsequent sync operation.

In step 714, the server 106 converts each data item received from the client 104 in step 712 to its original native format. This is essentially the reverse operation of step 706, and its operation will be apparent to persons skilled in the relevant arts based on the teachings contained herein.

In step 716, the server 106 transmits the converted data items in their native data formats to the respective sources 102, to thereby update the sources 102.

Figure 5:
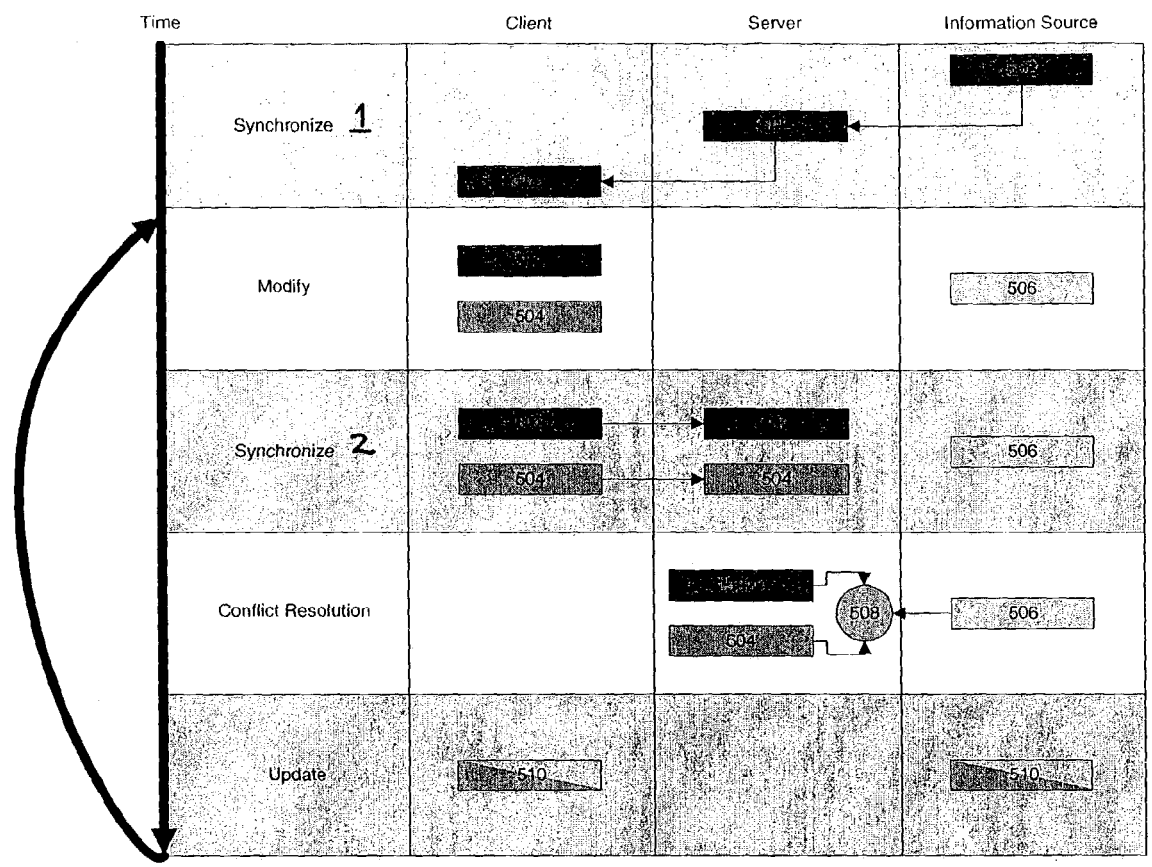
FIG. 5 illustrates a synchronization process for a given information source in accordance with an embodiment of the invention.

FIG. 5 illustrates a synchronization process 500 for a given information source in accordance with an embodiment of the invention. The invention, however, is not limited to the description provided herein with respect to flow diagram 500. Rather, it will be apparent to persons skilled in the relevant art(s) after reading the teachings provided herein that other functional flows are within the scope and spirit of the present invention. In one embodiment, the process is performed once for each information source 102. In other embodiments, the process may be performed one or more times.

The first step is the synchronization step 1. Initially, the current state of the information data 502 for an information source 102 is retrieved by server 106 as described above with reference to FIG. 3. The data is then communicated to the client and stored in the appropriate storage units 202, 204, or 206. The connection between server 106 and client 104 is then severed.

The next step is the modification step. Changes 504 are then made on client 104. Changes 504 may include the creation of new data, the deletion of existing data or the updating of existing data. Changes may also be made to information source 102 through means external to the present invention. These changes are represented in process 500 as 506.

In the next synchronization step (synchronize 2), a new connection is made between client 104 and server 106. In this embodiment, both the original state of the data and the changes are then communicated from the client to the server. In an alternative embodiment, the original state could be cached on the server so that only the changes would need to be communicated by the client.

The next state is the conflict resolution step. A conflict resolution module 508 compares the original state 502 with the client changes 504 and the new state of information source 102. A record of the state of the data at the time of the last synchronization 502 is kept, thus a determination as to whether client changes 504 conflict with new information source 506 is made. A new state 510 is formed from this determination. The new state 510 is then communicated to both information source 102 and client 104 during the update step.

Figure 11A:
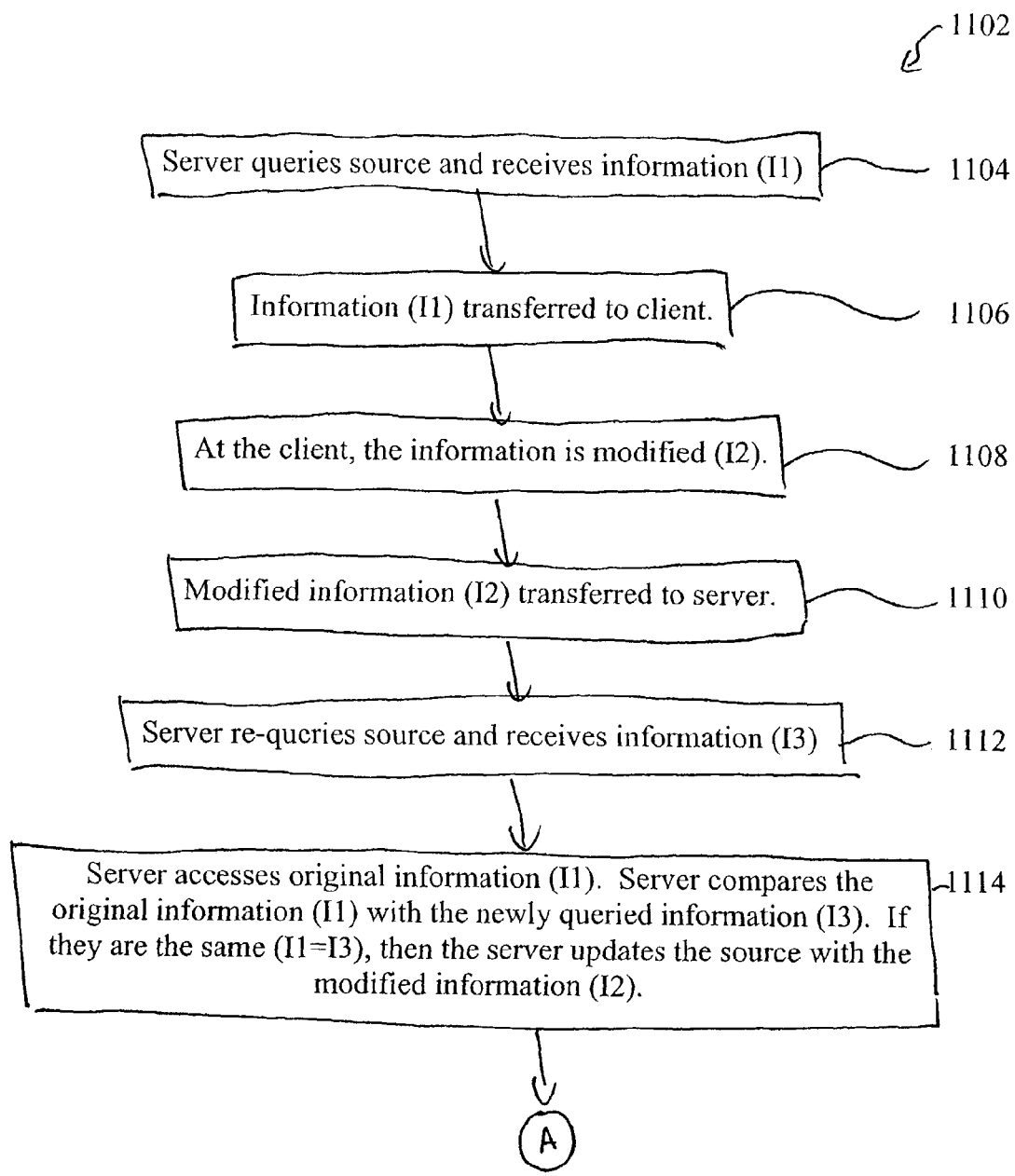

The operation of an embodiment of the synchronization process 500 shall now be described in greater detail with respect to a flowchart 1102 shown in FIG. 11.

In step 1104, the server 106 queries various sources 102 and receives information there from. For reference purposes, such information shall be referred to as I1.

In step 1106, this information (I1) is transferred to the client 104 during a sync operation.

In step 1108, at the client 1104, the information (I1) is modified to thereby generate modified information (I2).

In step 1110, the modified information (I2) is transferred to the server 106 during a subsequent sync operation.

In step 1112, the server 106 re-queries the respective sources 102 (the same ones queried in step 1104, or a subset thereof) and receives information (I3).

In step 1114, the server 106 accesses the original information (I1). Such original information (I1) could have been stored at the server 106, or stored at the client 104 and transmitted to the server 106 in step 1110.

If the server 106 determines that the original information (I1) is the same as the newly queried information (I3), then the server 106 knows that the corresponding information was not modified at the information source. Thus, conflict does not exist (conflict might exist if the same data was modified at both the original source and the client 104). As a result, the server 106 updates the source with the modified information (I2).

In step 1116, if the server 106 determines instead that the original information (I1) is not the same as the newly queried information (I3), then the server 106 knows that this information was modified at both the client 104 and the source 102. Accordingly, a conflict exists because the same information was modified in two places.

The server 106 then proceeds according to predetermined conflict resolution procedures. For example, in a first option, the server 106 has been instructed that the client 104 always wins in such conflicts. Accordingly, the server 106 would update the source with the modified information (I2).

In a second option, the server 106 has been instructed that the source 102 wins such conflict situations. In this case, the server 106 would not update the source 102 with the modified information (I2).

In option 3, the server 106 queries the user for instructions regarding resolution of the conflict.

It is noted that the invention is directed to computer program products having the functionality described herein. A computer program product is any object in which computer software is stored, such as floppy disks, optical or magnetic storage devices, hard drives, tapes, signals over any medium (such as over the air, telephone, internet, etc.), etc. The computer software, when executed in a computer(s), causes the computer(s) to perform the functions described herein.

CONCLUSION

The present invention is not limited to the embodiments described herein. The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A method for exchanging data between a plurality of clients and information sources via a server, comprising:
   (a) obtaining data objects from a plurality of sources, said data objects being in native formats specific to their respective sources;
   (b) converting said data objects to a common data format, wherein said common data format differs from said native formats; and
   (c) transmitting said converted data objects in said common data format to said plurality of clients, said clients configured to display said converted data objects in said common data format using a common interface, wherein said common interface operates without regard for said native formats, and wherein said common interface allows manipulation of said data objects in said common data format.

2. The method of claim 1, wherein said data objects are modified at said clients, said data objects in said common data format, and wherein said modified data objects are transmitted to said server, further comprising:
   (d) receiving said modified data objects;
   (e) converting said received modified data objects to their respective native formats; and
   (f) transmitting said converted modified data objects to said source.

3. The method of claim 1, wherein step (b) comprises:
   converting ODBC data objects to said common data format.

4. The method of claim 1, wherein step (b) comprises:
   converting XML data objects to said common data format.

5. The method of claim 1, wherein step (b) comprises:
   converting word processor data objects to said common data format.

6. The method of claim 1, wherein said common data format defines an XML data object.

7. An article of manufacture including a computer-readable medium having instructions stored thereon that, if executed by a processing device, cause the processing device to perform operations comprising:

obtaining data objects from a plurality of sources, said data objects being in native formats specific to their respective sources;

converting said data objects to a common data format, wherein said common data format differs from said native formats; and transmitting said converted data objects in said common data format to a plurality of clients, said clients configured to display said converted data objects in said common data format using a common interface, wherein said common interface operates without regard for said native formats, and wherein said common interface allows manipulation of said data objects in said common data format.

8. The article of manufacture of claim 7, wherein said data objects are modified at said clients, said data objects in said common data format, and wherein said modified data objects are transmitted to said server, said operations further comprising:

receiving said modified data objects;

converting said received modified data objects to their respective native formats; and transmitting said converted modified data objects to said source.

9. The article of manufacture product of claim 7, said converting comprising:

converting ODBC data objects to said common data format.

10. The article of manufacture product of claim 7, said converting comprising:

converting XML data objects to said common data format.

11. The article of manufacture product of claim 7, said converting comprising:

converting word processor data objects to said common data format.

12. The article of manufacture of claim 7, wherein said common data format defines an XML data object.

13. A system to exchange data between a plurality of clients and information sources via a server, comprising:

a first module configured to obtain data objects from a plurality of sources, said data objects being in native formats specific to their respective sources;

a second module configured to convert said data objects to a common data format, wherein said common data format differs from said native formats; and a third module configured to transmit said converted data objects in said common data format to said plurality of clients, said clients configured to display said converted data objects in said common data format using a common interface, wherein said common interface operates without regard for said native formats, and wherein said common interface allows manipulation of said data objects in said common data format.

14. The system of claim 13, wherein said data objects are modified at said clients, said data objects in said common data format, and wherein said modified data objects are transmitted to said server, further comprising:

a fourth module configured to convert said modified data objects to their respective native formats; and a fifth module configured to transmit said converted modified data objects to said source.

* * * * *